US009846821B2

(12) United States Patent
Li et al.

(10) Patent No.: US 9,846,821 B2
(45) Date of Patent: Dec. 19, 2017

(54) FAST OBJECT DETECTION METHOD BASED ON DEFORMABLE PART MODEL (DPM)

(71) Applicant: ZHEJIANG SHENGHUI LIGHTING CO., LTD, Jiaxing (CN)

(72) Inventors: Maolin Li, Jiaxing (CN); Jinxiang Shen, Jiaxing (CN)

(73) Assignee: ZHEJIANG SHENGHUI LIGHTING CO., LTD, Jiaxing (CN)

( * ) Notice: Subject to any disclaimer, the term of this patent is extended or adjusted under 35 U.S.C. 154(b) by 17 days.

(21) Appl. No.: 15/024,278

(22) PCT Filed: Jul. 28, 2015

(86) PCT No.: PCT/CN2015/085271
§ 371 (c)(1),
(2) Date: Mar. 24, 2016

(87) PCT Pub. No.: WO2016/026371
PCT Pub. Date: Feb. 25, 2016

(65) Prior Publication Data
US 2016/0210530 A1    Jul. 21, 2016

(30) Foreign Application Priority Data

Aug. 22, 2014  (CN) .......................... 2014 1 0417722

(51) Int. Cl.
*G06K 9/00* (2006.01)
*G06K 9/62* (2006.01)
(Continued)

(52) U.S. Cl.
CPC .............. *G06K 9/627* (2013.01); *G06K 9/00* (2013.01); *G06K 9/00718* (2013.01);
(Continued)

(58) Field of Classification Search
CPC .......... G06K 9/00201; G06K 9/00228; G06K 9/00671; G06K 9/3233; G06K 9/00248;
(Continued)

(56) References Cited

U.S. PATENT DOCUMENTS 6,594,378 B1 *  7/2003  Li .......................... G06T 3/0068
                                                                    128/922
7,253,832 B2 *  8/2007  Iwaki ...................... G06T 17/10
                                                                    348/37
(Continued)

FOREIGN PATENT DOCUMENTS

CN       103186790 A      7/2013
CN       104200236 A      12/2014

OTHER PUBLICATIONS

The World Intellectual Property Organization (WIPO) International Search Report for PCT/CN2015/085271 dated Nov. 12, 2015.

*Primary Examiner* — Aklilu Woldemariam
(74) *Attorney, Agent, or Firm* — Anova Law Group, PLLC

(57) ABSTRACT

A fast object detection method based on deformable part model (DPM) is provided. The method includes importing a trained classifier for object detection, receiving an image frame from a plurality of frames in a video captured by a camera, and identifying regions possibly containing at least one object via objectness measure based on Binarized Normed Gradients (BING). The method also includes calculating Histogram of Oriented Gradients (HOG) feature pyramid of the image frame, performing DPM detection for the identified regions possibly containing the at least one object, and labeling the at least one detected object using at least one rectangle box via non-maximum suppression (NMS). Further, the method includes processing a next (Continued)

frame from the plurality of frames in the captured video until the video ends and outputting object detection results.

9 Claims, 3 Drawing Sheets

(51) Int. Cl.
  *G06K 9/46* (2006.01)
  *G06K 9/52* (2006.01)
  *G06T 7/73* (2017.01)

(52) U.S. Cl.
  CPC ......... *G06K 9/00765* (2013.01); *G06K 9/468* (2013.01); *G06K 9/4642* (2013.01); *G06K 9/52* (2013.01); *G06K 9/6269* (2013.01); *G06T 7/73* (2017.01); *G06K 2009/4666* (2013.01)

(58) Field of Classification Search
  CPC ....... G06K 9/00281; G06K 2009/3225; G06K 9/00664; G06K 9/3216; G06K 9/00221; G06K 9/00268; G06K 9/00288; G06K 9/00127; G06K 9/00805; G06K 2009/3291; G06K 9/3241; G06K 9/6256; G06K 9/621; G06K 2209/01; G06K 2009/4666; G06K 9/00765; G06K 9/3208; G06K 9/52; G06K 9/4671; G06K 9/00771; G06K 9/42; G06K 9/4642; G06K 9/00369; G06K 9/00993; G06K 9/6218; G06K 9/6257; G06K 9/6267; G06K 9/6269; G06K 9/627; G06K 9/6286; G06K 9/72; G06T 7/215; G06T 7/251; G06T 2207/20164; G06T 7/11; G06T 7/12; G06T 7/60; G06T 7/149; G06T 7/344; G06T 7/74; G06T 17/00; G06T 7/10; G06T 7/70; G06T 2207/20081; G06T 2207/30236; G06T 7/254; G06T 7/593; G06T 7/73; A61B 5/1075; G06F 3/011; G06F 3/0304; Y10S 128/922; H04N 5/144; H04N 7/181; H04N 1/4092; H04N 1/58; G08G 1/161
  USPC .... 382/103, 106, 115, 154, 159; 348/43, 47, 348/152
  See application file for complete search history.

(56) References Cited

U.S. PATENT DOCUMENTS

| | | | | |
|---|---|---|---|---|
| 7,873,185 B2* | 1/2011 | Cremers | ............... | G06K 9/6207 348/143 |
| 8,154,594 B2* | 4/2012 | Seki | .................. | B60R 1/00 348/119 |
| 8,488,023 B2* | 7/2013 | Bacivarov | .......... | G06K 9/00281 348/239 |
| 9,317,764 B2* | 4/2016 | Baheti | ................. | G06K 9/2054 |
| 2002/0191823 A1* | 12/2002 | Wehrli | .................. | A61B 5/417 382/128 |
| 2003/0035507 A1* | 2/2003 | Hsu | ....................... | G06T 7/0012 378/4 |
| 2003/0235341 A1* | 12/2003 | Gokturk | ............ | G06K 9/00228 382/243 |
| 2004/0101162 A1* | 5/2004 | Higaki | .................. | G01C 11/00 382/103 |
| 2004/0218806 A1* | 11/2004 | Miyamoto | ........... | G06K 9/6253 382/145 |
| 2005/0063582 A1* | 3/2005 | Park | ....................... | G06T 17/10 382/154 |
| 2006/0147108 A1* | 7/2006 | Kee | .................... | G06K 9/00228 382/159 |
| 2010/0201820 A1* | 8/2010 | Lopota | ................... | G06T 7/194 348/152 |
| 2010/0215276 A1* | 8/2010 | Suwa | ..................... | G06K 9/342 382/218 |
| 2011/0007174 A1* | 1/2011 | Bacivarov | .......... | G06K 9/00281 348/222.1 |
| 2012/0143037 A1* | 6/2012 | Najarian | ................ | A61B 6/032 600/407 |
| 2013/0101170 A1* | 4/2013 | Park | ....................... | G06T 7/0079 382/103 |
| 2013/0300900 A1* | 11/2013 | Pfister | ................ | G06K 9/00315 348/239 |
| 2014/0079297 A1* | 3/2014 | Tadayon | ................. | G06K 9/00 382/118 |
| 2014/0133742 A1* | 5/2014 | Xiao | .................. | G06K 9/00664 382/159 |
| 2014/0270374 A1* | 9/2014 | Unzueta | ............. | G06K 9/00281 382/103 |
| 2014/0286529 A1* | 9/2014 | Sprenger | ............ | G06K 9/00127 382/103 |
| 2015/0110349 A1* | 4/2015 | Feng | .................. | G06K 9/00234 382/103 |
| 2015/0221118 A1* | 8/2015 | Shaburova | ............. | G06T 5/005 345/423 |

* cited by examiner

200

FAST OBJECT DETECTION METHOD BASED ON DEFORMABLE PART MODEL (DPM)

CROSS-REFERENCES TO RELATED APPLICATIONS

This application is a national stage application under 35 USC §371(c) of PCT Application No. PCT/CN2015/085271, entitled "FAST OBJECT DETECTION METHOD BASED ON DEFORMABLE PART MODEL (DPM)," filed on Jul. 28, 2015, which claims priority to Chinese Patent Application No. 201410417722.7, filed on Aug. 22, 2014. The entire disclosure and contents of the above applications are hereby incorporated by reference herein.

FIELD OF THE INVENTION

The present invention generally relates to the field of computer vision technologies and, more particularly, to fast object detection methods and systems based on deformable part model (DPM).

BACKGROUND

Object detection is an important research domain in computer vision. Object detection is the basis for further analyzing objects. Based on the object detection, object tracking and behavioral analysis can be implemented. Currently, there are a number of object detection models known in the academic field. A deformable part model (DPM) may be the most popular model for object detection in images in the past two years. Because it can accurately detect objects, DPM has become popular and is recognized as a desired object detection algorithm.

DPM includes three components: (1) a coarse global root template (also called a root filter) that approximately covers an entire object; (2) several high resolution part templates (also called part filters) that cover smaller parts of the object; and (3) space locations of the part templates relative to the global root template.

The feature map is an array whose entries are d-dimensional feature vectors computed from a dense grid of locations in an image. A filter is a rectangular template defined by an array of d-dimensional weight vectors. The score of a filter F at a position (x; y) in a feature map G is the "dot product" of the filter and a subwindow of the feature map with top-left corner at (x; y).

According to a score of a detection window, whether there is an object to be detected is determined. The score of the detection window is the sum of the score of the root filter and the scores of all part filters. The score of each part filter is the maximum value of the scores of various spatial locations of the part filter. The scores of the spatial locations of each part filter are obtained by the scores of each part filter at their respective locations minus a deformation cost that depends on the relative location of each part with respect to the root.

Objectness measure can detect regions that possibly contain the object, improving the accuracy of the object detection. A desired objectness measure can accelerate the speed of the object detection. The desired objectness measure needs to meet the following requirements: a higher detection rate; suspected object regions remain as few as possible; higher computational efficiency; and scalability.

As described above, although existing DPM object detection methods can detect accurately the object to be detected, the process is time-consuming. Therefore, it is very difficult to directly apply DPM to real products. Objectness measure with a higher detection rate and scalability can detect the object in real time. However, because a learning method used in the objectness measure is relatively simple, more regions may be generated. Therefore, it is necessary to provide a new object detection method. That is, in a new object detection method, at the beginning, the objectness measure may be applied; and then a fast Fourier object detection method based on DPM (ODDPM) may be applied to the regions that possibly contain the object.

The disclosed methods and systems are directed to solve one or more problems set forth above and other problems. For example, the fast object detection method based on DPM can be applied in battlefield surveillance, video monitoring, image compression, image retrieve, human-computer interaction, and so on.

BRIEF SUMMARY OF THE DISCLOSURE

One aspect of the present disclosure includes a fast object detection method based on deformable part model (DPM). The method includes importing a trained classifier for object detection, receiving an image frame from a plurality of frames in a video captured by a camera, and identifying regions possibly containing at least one object via objectness measure based on Binarized Normed Gradients (BING). The method also includes calculating Histogram of Oriented Gradients (HOG) feature pyramid of the image frame, performing DPM detection for the identified regions possibly containing the at least one object, and labeling the at least one detected object using at least one rectangle box via non-maximum suppression (NMS). Further, the method includes processing a next frame from the plurality of frames in the captured video until the video ends and outputting object detection results.

Another aspect of the present disclosure includes a fast object detection system based on deformable part model (DPM). The system includes a camera configured to capture a video and a receiving module configured to receive an image frame from a plurality of frames in the video captured by the camera. The system also includes an objectness measure module configured to generate regions possibly containing at least one object via objectness measure based on Binarized Normed Gradients (BING) and a Histogram of Oriented Gradients (HOG) module configured to calculate HOG feature pyramid of the image frame. Further, the system includes a DPM detection module configured to perform DPM detection for the identified regions possibly containing the at least one object and a label module configured to label the at least one detected object using at least one rectangle box via non-maximum suppression (NMS).

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
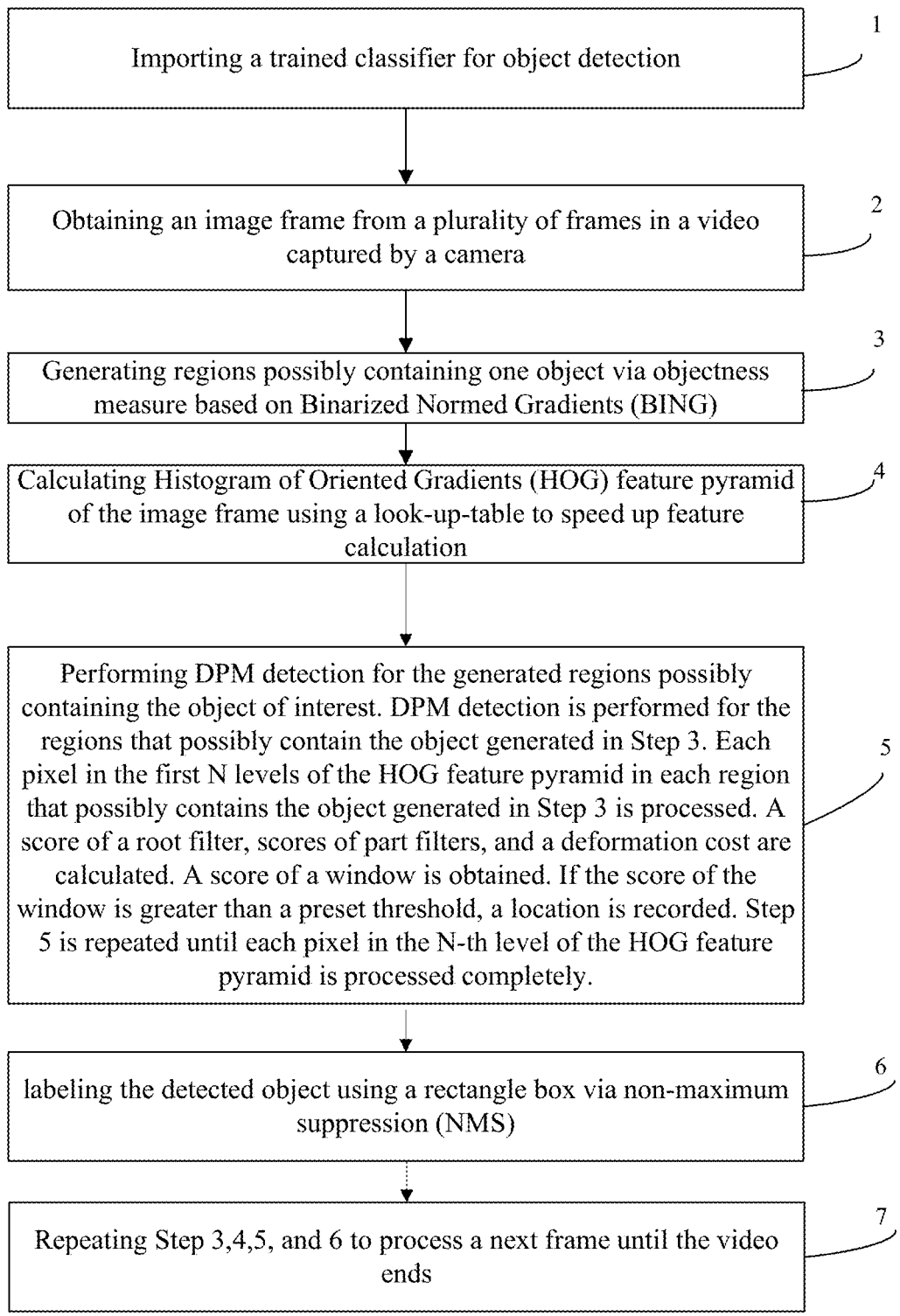
FIG. 1 illustrates a flow chart of an exemplary fast object detection process based on DPM consistent with the disclosed embodiments.

Reference will now be made in detail to exemplary embodiments of the invention, which are illustrated in the accompanying drawings. Wherever possible, the same reference numbers will be used throughout the drawings to refer to the same or like parts.

First, before a fast object detection process based on DPM (ODDPM) is introduced, an object detection algorithm is described in the following paragraphs.

A model for an object with n parts is formally defined by a (n+2)-tuple (F0, P1, . . . , Pn, b), where F0 is a root filter, Pi is a model for the i-th part and b is a real-valued bias term. Each part model is defined by a 3-tuple (Fi, vi, di), where Fi is a filter for the i-th part, vi is a two-dimensional vector specifying an "anchor" position for part i relative to the root position, and di is a four-dimensional vector specifying coefficients of a quadratic function defining a deformation cost for each possible placement of the part relative to the anchor position.

An object hypothesis specifies the location of each filter in the model in a feature pyramid, z=(p0, . . . , pn), where pi=(xi, yi, li) specifies the level and position of the i-th filter. It is requires that the level of each part is such that the feature map at that level is computed at twice the resolution of the root level, li=l0−λ for i>0. The feature map is an array whose entries are d-dimensional feature vectors computed from a dense grid of locations in an image. A filter is a rectangular template defined by an array of d-dimensional weight vectors. The score of a filter F at a position (x; y) in a feature map G is the "dot product" of the filter and a subwindow of the feature map with top-left corner at (x; y). The score of a hypothesis is given by the scores of each filter at their respective locations (the data term) minus a deformation cost that depends on the relative position of each part with respect to the root (the spatial prior), plus the bias b, $$\text{score}(p_0, \ldots, p_n) = \sum_{i=0}^{n} F'_i \cdot \phi(H, p_i) - \sum_{i=1}^{n} d_i \cdot \phi_d(dx_i, dy_i) + b, \quad (1)$$

where $$(dx_i, dy_i) = (x_i, y_i) - (2(x_0, y_0) + v_i) \quad (2)$$

gives the displacement of the i-th part relative to its anchor position and $$\phi_d(dx, dy) = (dx, dy, dx^2, dy^2) \quad (3)$$

are deformation features (horizontal and vertical displacement and its square).

Note that if di=(0, 0, 1, 1) the deformation cost for the i-th part is the squared distance between its actual position and its anchor position relative to the root. In general, the deformation cost is an arbitrary separable quadratic function of the displacements.

The bias term is introduced in the score to make the scores of multiple models comparable when we combine them into a mixture model. The score of a hypothesis z can be expressed in terms of a dot product, $\beta \cdot \psi(H, z)$, between a vector of model parameters $\beta$ and a vector $\psi(H, z)$, $$\beta = (F'_0, \ldots, F'_n, d_1, \ldots, d_n, b). \quad (4)$$

$$\psi(H,z) = (\phi(H,p_0), \ldots \phi(H,p_n), -\phi_d(dx_1, dy_1), \ldots, -\phi_d(dx_n, dy_n), 1). \quad (5)$$

This illustrates a connection between our models and linear classifiers. This relationship for learning the model parameters with the latent Support Vector Machine framework (LSVM) is used.

FIG. 1 illustrates a flow chart of an exemplary fast object detection process based on DPM consistent with the disclosed embodiments. As shown in FIG. 1, the fast object detection process based on DPM may include the following steps.

Step 1: a trained classifier for object detection is imported.

Specifically, a classifier is trained with a few hundred sample views of a particular object (i.e., a face, a car). After the classifier is trained, it can be applied to a region in an input image to search for the object of interest.

Step 2: an image frame is obtained from a video captured by a camera.

Because a video is a sequence of frames and changes between consecutive frames are relatively small due to typical frame rate for a video (e.g. 25 frames/second), instead of dealing with each frame individually, some grouping or clustering techniques may be applied to separate the whole video into different sets of frames with each set has similar frames for further processing.

Figure 3:
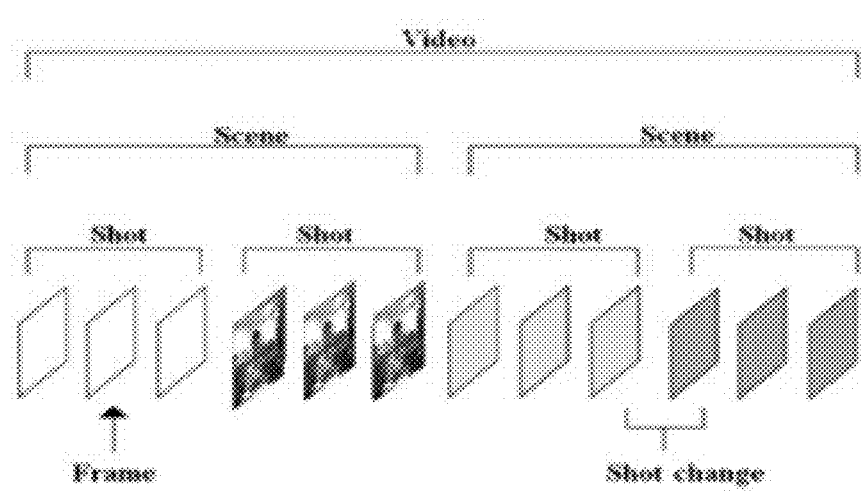
FIG. 3 illustrates a video stream being divided into different video components.

For example, FIG. 3 illustrates a video stream being divided into different video components. As show in FIG. 3, a video stream may be divided into scenes, a scene may be divided into shots, and a shot may be divided into frames, etc. The frame can be further divided into objects and features of the video frame may be extracted for further processing.

Returning to FIG. 1, after the image frame is obtained, the process goes to Step 3.

Step 3: regions possibly containing an object of interest are identified via objectness measure based on Binarized Normed Gradients (BING).

The objectness measure acts as a class-generic object detector. It quantifies how likely it is for an image window to contain an object of any class, such as cars and dogs, as opposed to backgrounds, such as grass and water. Objectness is computationally efficient. For example, on a personal computer (PC), it may takes fewer than 3 seconds to compute the objectness measure and to sample 1000 windows, for an image of size 350×500. Objectness is intended to be a low-level preprocessing and to propose a small number of windows likely to cover all objects in the image.

Step 4: Histogram of Oriented Gradients (HOG) feature pyramid of the image frame is calculated using a look-up-table to speed up feature calculation.

HOG are feature descriptors used in computer vision and image processing for the purpose of object detection. The technique counts occurrences of gradient orientation in localized portions of an image. In one example, for each scale, the pixel-wise feature map, spatial aggregation and normalization are operated in sequence. In the pixel-wise feature map step, the gradient of each pixel is discretized into different partitions according to the orientation. In the spatial aggregation step, the gradient magnitude of each pixel is added to its corresponding bins in four cells around it with bilinear interpolation weight. Then, a normalization step is applied to gain the invariance by normalizing feature vector with energy of four cells around.

In some embodiments, the fast object detection system may use look-up tables to accelerate the pixel-wise feature map step and the spatial aggregation step. In the pixel-wise feature map step, there are only limited cases of gradient orientation and magnitude, which can be stored in a loo-up table. In the spatial aggregation step, the computation of the bilinear interpolation weight is determined. Since the possible bilinear weight number is the HOG bin size it can be computed in advance and stored in a look-up table.

Step 5: DPM detection is performed for the regions possibly containing the object of interest generated in Step 3. Each pixel in the first N levels of the HOG feature pyramid in each region possibly containing the object of interest generated in Step 3 is processed, where N is an integer greater than 1. A score of a root filter, scores of part filters, and a deformation cost are calculated. Based on Equation (1), a score of a window is calculated. If the score of the window is greater than a preset threshold, a current location is recorded. Step 5 is repeated until each pixel in the N-th level of the HOG feature pyramid is processed completely.

Step 6: a rectangle box is used to label the detected object via non-maximum suppression (NMS).

Non-maximum suppression is used along with edge detection algorithms. The image is scanned along the image gradient direction, and if pixels are not part of the local maxima, the pixels are set to zero. This has the effect of suppressing all image information that is not part of local maxima.

Step 7: Steps 3, 4, 5, and 6 are repeated for processing the next frame of the video until the video ends. Finally, the results of object detection are outputted.

Figure 2:
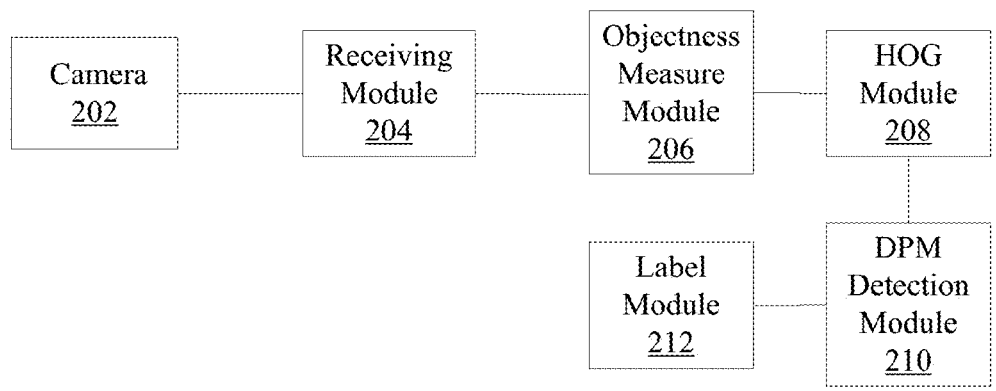
FIG. 2 illustrates a schematic diagram of an exemplary fast object detection system based on DPM consistent with the disclosed embodiments.

FIG. 2 illustrates a schematic diagram of an exemplary fast object detection system based on DPM consistent with the disclosed embodiments. As shown in FIG. 2, the fast object detection system 200 based on DPM includes a camera 202, a receiving module 204, an objectness measure module 206, a HOG module 208, a DPM detection module 210, and a label module 212. Certain modules may be omitted and other modules may be included.

The camera 202 may be configured to capture a video. The receiving module 204 may be configured to receive an image frame from a plurality of frames in a video captured by the camera 202.

The objectness measure module 206 may be configured to generate regions that possibly contain at least one object via objectness measure based on Binarized Normed Gradients (BING).

The HOG module 208 may be configured to calculate an image HOG feature pyramid using a look-up-table to speed up feature calculation.

The DPM detection module 210 may be configured to perform DPM detection for the identified regions that possibly contain the object. The DPM detection module 210 may further include a processing unit and a calculation unit. The processing unit may be configured to process each pixel in the first N levels of the HOG feature pyramid in each identified region that possibly contains the object, where N is an integer greater than 1. The calculation unit may be configured to calculate a score of a root filter, scores of part filters, a deformation cost, and a score of a window, respectively. When the score of the window is greater than a preset threshold, a current location is recorded.

The label module 212 may be configured to label one detected object using a rectangle box via non-maximum suppression (NMS).

Figure 4:
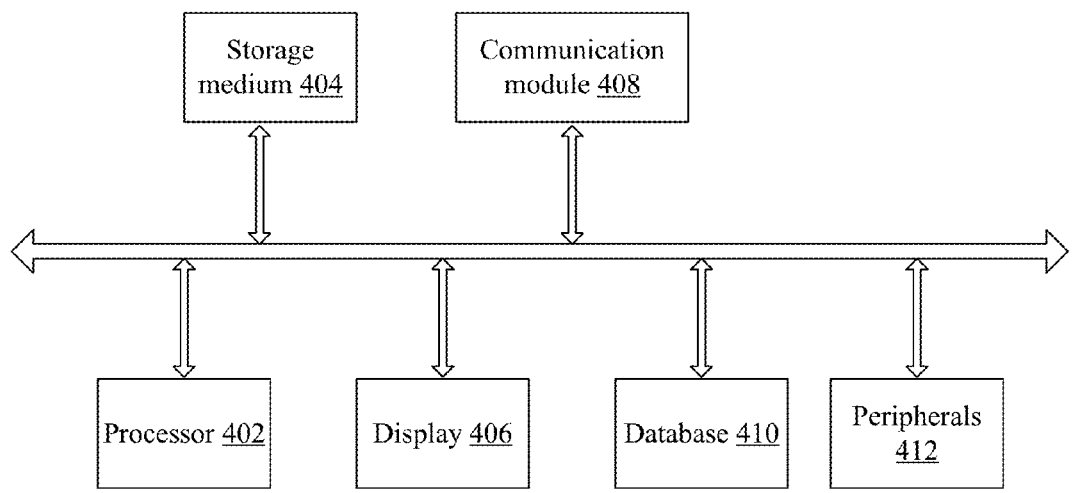
FIG. 4 illustrates an exemplary computing system consistent with the disclosed embodiments.

FIG. 4 illustrates an exemplary computing system consistent with the disclosed embodiments. As shown in FIG. 4, computing system 400 may include a processor 402, a storage medium 404, a display 406, a communication module 408, a database 410, and peripherals 412. Certain devices may be omitted and other devices may be included.

Processor 402 may include any appropriate processor or processors. Further, processor 402 can include multiple cores for multi-thread or parallel processing. Storage medium 404 may include memory modules, such as ROM, RAM, flash memory modules, and mass storages, such as CD-ROM and hard disk, etc. Storage medium 404 may store computer programs for implementing various processes when the computer programs are executed by processor 402.

Further, peripherals 412 may include various sensors and other I/O devices, such as keyboard and mouse, and communication module 408 may include certain network interface devices for establishing connections through communication networks. Database 410 may include one or more databases for storing certain data and for performing certain operations on the stored data, such as database searching.

Some embodiments consistent with the disclosure may be implemented in a camera system integrated with an LED (light emitting diode) lighting device. For example, a stationary video camera may be integrated with an LED lighting system to provide video image of a certain location. The fast object detection system may enable the camera system to detect certain objects in real time. Further, the camera system may control the lighting provided by the LED lighting device to improve the results of the fast object detection system. In one example, the camera system may adjust the lighting (e.g., orientation of lighting, brightness, etc.) generated by the LED lighting device(s) to improve the object detection results in certain area within the camera's covered area. For example, when the rate of object detection is lower than a pre-set number for a certain location, by increasing the light intensity or change the light orientation of the corresponding area that is being video recorded, the system of fast object detection may be able to improve the object detection results of that area because the quality of the image of that area may be improved by the brighter lighting. With the fast object detection system, the camera system may adjust the LED lighting in real time to improve the object detection capabilities of the camera system.

Further, although the methods and systems are disclosed for illustrative purposes, similar concept and approach can be applied to other object detection system. For example, the fast object detection method based on DPM can be applied in battlefield surveillance, video monitoring, image compression, image retrieve, human-computer interaction, and so on. Other applications, advantages, alternations, modifications, or equivalents to the disclosed embodiments are obvious to those skilled in the art.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Compared to existing technologies, the provided fast object detection process based on DPM has the following features: (1) a look-up-table is used to speed up feature calculation; (2) the regions that do not contain any object of interest are filtered via the objectness measure based on BING and the detection process is accelerated; (3) the proposed fast object detection based on DPM can detect the object in real time and can be effectively used in engineering.

What is claimed is:

1. A fast object detection method based on a deformable part model (DPM) implemented by an object detection system, comprising:

importing a trained classifier for object detection;

receiving an image frame from a plurality of image frames in a video captured by a camera;

identifying candidate regions in the image frame that may contain at least one object via objectness measure based on Binarized Normed Gradients (BING), the candidate regions being a subpart of the received image frame, wherein the objectness measure quantifies how likely it is for a region in the image frame to contain an object as opposed to backgrounds;

calculating Histogram of Oriented Gradients (HOG) feature pyramid of the image frame;

performing DPM detection for the identified candidate regions that may contain the at least one object based on the calculated HOG feature pyramid;

labeling the at least one detected object using at least one rectangle box via non-maximum suppression (NMS);

processing a next frame from the plurality of frames in the captured video until the video ends; and outputting object detection results, wherein:

the fast object detection method is integrated with a LED lighting device;

a model for an object with n parts is formally defined by (n+2)-tuple (F0, P1, ..., Pn, b), wherein F0 is a root filter, Pi is a model for a i-th part and b is a real-valued bias term, n being an integer; and provided that a location of each filter in a feature pyramid is (p0, ..., pn), and pi=(xi, yi, li) specifies a level and position of the i-th filter, a score of a window is defined by:

$$\text{score}(p_0, \ldots, p_n) = \sum_{i=0}^{n} F'_i \cdot \phi(H, p_i) - \sum_{i=1}^{n} d_i \cdot \phi_d(dx_i, dy_i) + b,$$

wherein:

Fi' denotes the i-th filter, H denotes HOG feature, di is a four-dimensional vector specifying coefficients of a quadratic function defining a deformation cost for each possible placement of the i-th part relative to its anchor position;

$$(dx_i, dy_i) = (x_i, y_i) - (2(x_0, y_0) + v_i)$$

gives a displacement of the i-th part relative to its anchor position;

and $$\phi_d(dx, dy) = (dx, dy, dx^2, dy^2)$$

are deformation features.

2. The method according to claim 1, further including:

processing each pixel in the first N levels of the HOG feature pyramid in each identified region that may contain the at least one object, wherein N is an integer greater than 1;

calculating a score of a root filter, scores of part filters, and a deformation cost, respectively; and calculating a score of a window.

3. The method according to claim 2, further including:

when the score of the window is greater than a preset threshold, recording a current location.

4. The method according to claim 1, wherein calculating Histogram of Oriented Gradients (HOG) feature pyramid of the image frame further includes:

calculating the HOG feature pyramid of the image frame using a look-up-table to speed up the feature calculation.

5. A fast object detection system based on a deformable part model (DPM), comprising:

a camera configured to capture a video;

a receiving module configured to receive an image frame from a plurality of frames in the video captured by the camera;

an objectness measure module configured to identify candidate regions in the image frame that may contain at least one object via the objectness measure based on Binarized Normed Gradients (BING), the candidate regions being a subpart of the received image frame, wherein the objectness measure quantifies how likely it is for a region in the image frame to contain an object as opposed to backgrounds;

a Histogram of Oriented Gradients (HOG) module configured to calculate a HOG feature pyramid of the image frame;

a DPM detection module configured to perform DPM detection for the identified candidate regions that may contain the at least one object based on the calculated HOG feature pyramid; and a label module configured to label the at least one detected object using at least one rectangle box via non-maximum suppression (NMS), wherein:

the fast object detection system is integrated with a LED lighting device;

a model for an object with n parts is formally defined by (n+2)-tuple (F0, P1, ..., Pn, b), wherein F0 is a root filter, Pi is a model for a i-th part and b is a real-valued bias term, n being an integer; and provided that a location of each filter in a feature pyramid is (p0, ..., pn), and pi=(xi, yi, li) specifies a level and position of the i-th filter, a score of a window is defined by:

$$\text{score}(p_0, \ldots, p_n) = \sum_{i=0}^{n} F'_i \cdot \phi(H, p_i) - \sum_{i=1}^{n} d_i \cdot \phi_d(dx_i, dy_i) + b,$$

wherein: Fi' denotes the i-th filter, H denotes HOG feature, di is a four-dimensional vector specifying coefficients of a quadratic function defining a deformation cost for each possible placement of the i-th part relative to its anchor position;

$$(dx_i, dy_i) = (x_i, y_i) - (2(x_0, y_0) + v_i)$$

gives a displacement of the i-th part relative to its anchor position and $$\phi_d(dx, dy) = (dx, dy, dx^2, dy^2)$$

are deformation features.

6. A The system according to claim 5, wherein the DPM detection module is further configured to:

process each pixel in the first N levels of the HOG feature pyramid in each identified region that may contain the at least one object, wherein N is an integer greater than 1; and calculate a score of a root filter, scores of part filters, a deformation cost, and a score of a window, respectively.

7. The system according to claim 6, wherein:

when the score of the window is greater than a preset threshold, a current location is recorded.

8. The system according to claim 5, wherein:

the HOG module is further configured to calculate the HOG feature pyramid of the image frame using a look-up-table to speed up feature calculation.

9. The system according to claim 5, wherein: when a rate of object detection is lower than a pre-set number for a certain location, the LED lighting device is configured to increase a light intensity or change a light orientation of a corresponding area that is being video recorded.

\* \* \* \* \*